(12) United States Patent
Marueli et al.

(10) Patent No.: US 10,347,134 B2
(45) Date of Patent: Jul. 9, 2019

(54) SYSTEM FOR NAVIGATING DRIVERS TO SELECTED LOCATIONS TO REDUCE PASSENGER WAIT TIME

(71) Applicant: GT Gettaxi Limited, Limassol (CY)

(72) Inventors: Sunny Marueli, Nes Ziona (IL); Ofer Samocha, Rishion Le-Zion (IL)

(73) Assignee: GT Gettaxi Limited, Limassol (CY)

( * ) Notice: Subject to any disclaimer, the term of this patent is extended or adjusted under 35 U.S.C. 154(b) by 651 days.

(21) Appl. No.: 14/985,745

(22) Filed: Dec. 31, 2015

(65) Prior Publication Data

US 2017/0193826 A1 Jul. 6, 2017

(51) Int. Cl.

| | |
|---|---|
| G06Q 10/00 | (2012.01) |
| G08G 1/00 | (2006.01) |
| G06Q 10/06 | (2012.01) |
| H04W 4/029 | (2018.01) |
| H04W 4/40 | (2018.01) |

(52) U.S. Cl.
CPC ....... *G08G 1/202* (2013.01); *G06Q 10/06311* (2013.01); *G06Q 10/06315* (2013.01); *H04W 4/029* (2018.02); *H04W 4/40* (2018.02)

(58) Field of Classification Search
CPC .................. G06Q 10/06311; G06Q 10/063115

USPC ......................................................... 705/7.13
See application file for complete search history.

(56) References Cited

U.S. PATENT DOCUMENTS

| | | | |
|---|---|---|---|
| 2003/0139941 A1* | 7/2003 | Matsumoto ............ | G06Q 30/02 705/13 |
| 2012/0041675 A1* | 2/2012 | Juliver ................... | G06Q 10/08 701/465 |
| 2016/0180346 A1* | 6/2016 | Cheng ................... | G06Q 30/016 705/304 |
| 2016/0335576 A1* | 11/2016 | Peng ................ | G06Q 10/06315 |

* cited by examiner

*Primary Examiner* — Alan S Miller
*Assistant Examiner* — Arif Ullah
(74) *Attorney, Agent, or Firm* — Lowenstein Sandler LLP

(57) ABSTRACT

In one embodiment, passenger demand for transportation by a driver associated with a transportation service is estimated for a first plurality of locations within a geographical region. A wait time parameter is determined for the geographical region, wherein the wait time parameter is based on one or more expected wait times associated with one or more locations of the geographical region, wherein an expected wait time is an estimate of the time that would elapse from a submission of a transportation request from the associated location until a driver of the transportation service will arrive at the associated location. A plurality of drivers are directed to a second plurality of locations within the geographical region based on the estimated passenger demand and the wait time parameter.

20 Claims, 6 Drawing Sheets

SYSTEM FOR NAVIGATING DRIVERS TO SELECTED LOCATIONS TO REDUCE PASSENGER WAIT TIME

TECHNICAL FIELD

This disclosure relates in general to the field of mobile applications and, more particularly, to a system for navigating drivers to selected locations to reduce passenger wait time.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment, passenger demand for transportation by a driver associated with a transportation service is estimated for a first plurality of locations within a geographical region. A wait time parameter is determined for the geographical region, wherein the wait time parameter is based on one or more expected wait times associated with one or more locations of the geographical region, wherein an expected wait time is an estimate of the time that would elapse from a submission of a transportation request from the associated location until a driver of the transportation service will arrive at the associated location. A plurality of drivers are directed to a second plurality of locations within the geographical region based on the estimated passenger demand and the wait time parameter.

Example Embodiments

Figure 1:
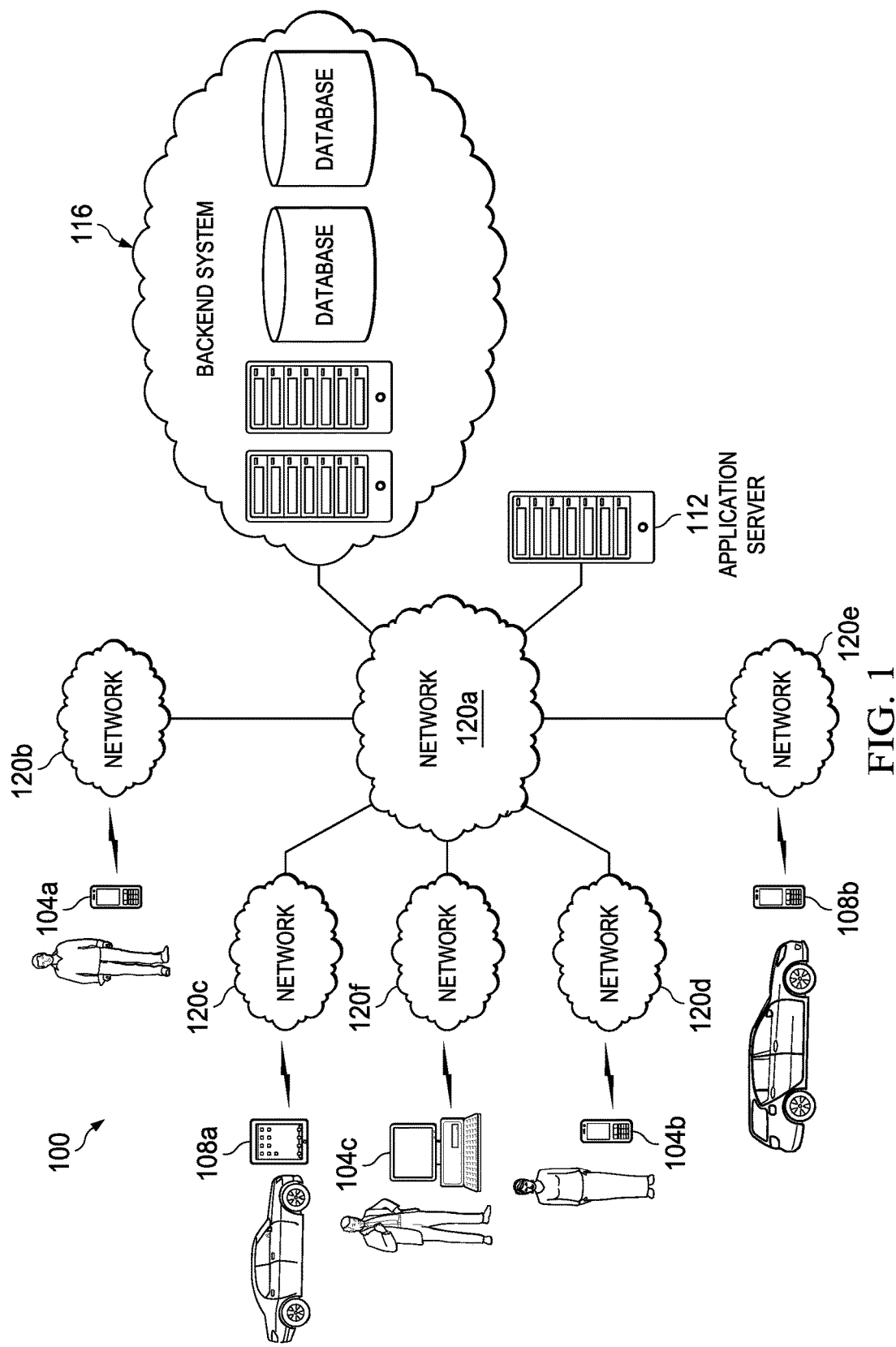
FIG. 1 illustrates a block diagram of system for navigating drivers to selected locations to reduce passenger wait time in accordance with certain embodiments.

FIG. 1 illustrates a block diagram of a system 100 for navigating drivers to selected locations to reduce passenger wait time in accordance with certain embodiments. Although various embodiments may include any number of drivers, passengers, and associated devices, system 100 depicts three passengers having associated passenger computing devices 104 and two drivers having associated driver computing devices 108. The computing devices are coupled through various networks 120 to an application server 112 and a backend system 116.

Various embodiments of the present disclosure may enhance the experience of passengers associated with a transportation service by optimizing the placement of drivers within a geographical region to reduce the amount of time spent waiting by the passengers for drivers to pick the passengers up. Various embodiments may redirect idle drivers (i.e., drivers that are not currently servicing a transportation request) to various locations within the region based on expected passenger demand and optimization of one or more wait time parameters. For example, various embodiments may seek to reduce the average expected wait time for all or a portion of prospective passengers, the maximum expected wait time for all or a portion of prospective passengers, or other suitable parameter associated with wait times of prospective passengers. Various embodiments may balance the optimization of the wait time parameter(s) with the distance driven by the idle drivers to achieve the optimization of the placement of the drivers. Various embodiments may provide technical advantages such as minimizing computing and communication resources expended during the time between a passenger request and a pickup of the passenger by a driver, minimizing fuel or power expended by drivers to achieve desirable fleet layouts, or other technical advantages.

Computing devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., computing device application 108 or logic thereof).

In various embodiments, a transportation service may control a fleet of vehicles. This may involve directing the drivers of the vehicles around a geographical region to pick up passengers and transport them to destination locations specified by the passengers. In various embodiments, this may also involve directing idle drivers to change location in order to optimize system parameters, such as expected wait times for prospective passengers. The fleet may include any suitable types of vehicles, such as vehicles owned by the transportation service, vehicles owned by the individual drivers, vehicles driven by human drivers, self-driven vehicles, or any suitable combination of these vehicles.

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), car preference information (e.g., what models or color of car the user prefers), or other account information.

The application may allow a user to request a ride from the transportation service. In various embodiments, the application may establish a pick-up location automatically or based on user input (e.g., locations may include the current location of the computing device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected through a deduction that the driver's computing device is not logged in to the transportation service through the driver application), or the driver may be "inactive," meaning that the driver only desires to receive particular requests meeting certain exception criteria specified by the driver.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term "computing device," is intended to encompass any suitable processing device. For example, portions of backend system 116 or application server 112 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
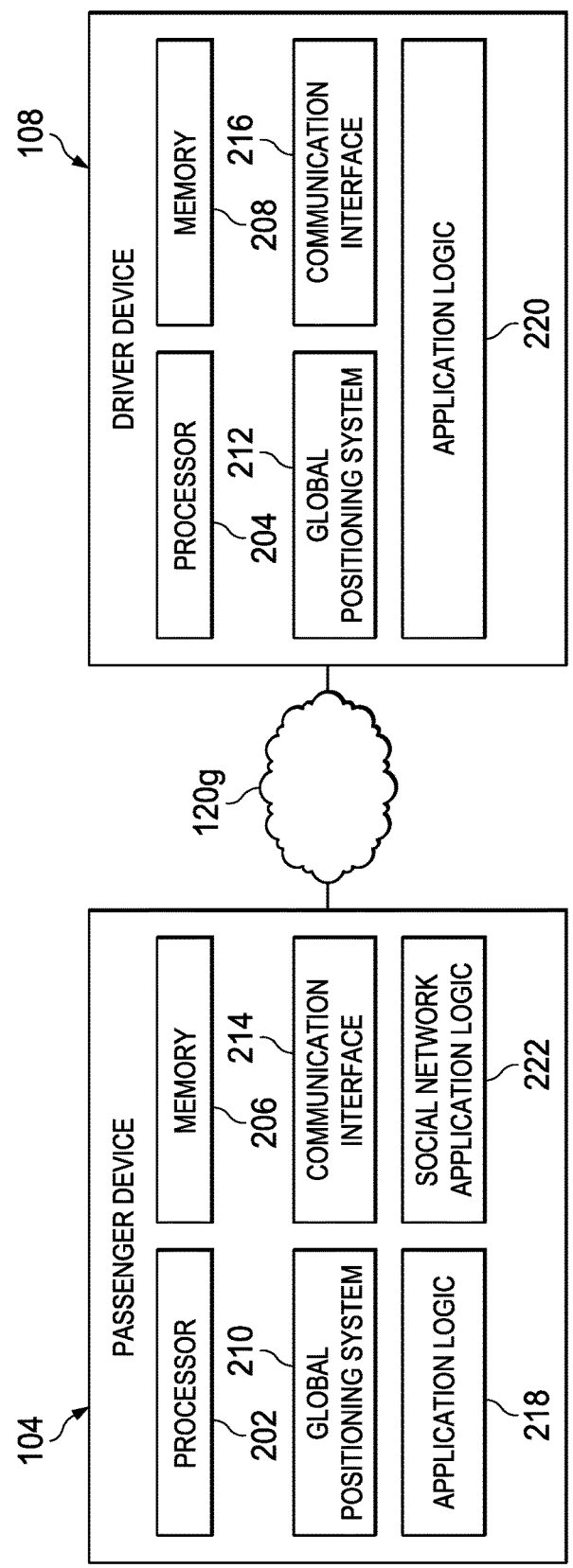
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of the system of FIG. 1 in accordance with certain embodiments. Herein, "passenger computing device" may be used to refer to a computing device used by a subscriber or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processors 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Passenger application logic 218 may include logic providing, at least in part, the functionality of the passenger application described herein. Similarly, driver application logic 220 may include logic providing, at least in part, the functionality of the driver application described herein. In a particular embodiment, the logic of devices 104 and 108 may include software that is executed by processor 202 and 204. However, "logic" as used in this Specification, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In a particular embodiment, a user may supply login credentials for a social network system (e.g., FACEBOOK) or other social media system (e.g., TWITTER) to the transportation service through passenger application logic 218. The transportation service (e.g., through backend server) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In various embodiments, the social network system may interact with passenger application logic 218 or backend system 116 to enhance the functionality of these components. As an example, background information associated with a passenger may be obtained by a backend system 116 and used to determine whether to route a request from the passenger to a particular driver.

In various embodiments, the social network system may provide any of the functionality listed above with respect to passenger application logic 218 in allowing a user to request a ride and may relay received requests for rides to backend system 116 along with any suitable identifying information about the user to facilitate pickup by a driver.

In various embodiments of the present disclosure, in addition to any combination of the features described above with respect to the driver application, driver application logic 220 may provide additional features for the driver application to enhance the functionality of the transportation service. For example, in various embodiments, driver application logic 220 may receive a request from backend system 116 to move to a new location and wait for a passenger request. In various embodiments, such requests may be sent to the driver application logic 220 in a period of time in which the driver is not transporting a passenger, but is available to transport a passenger. Such a driver may be referred to herein as an "idle" driver. Driver application logic 220 may provide an interface that allows the driver to indicate whether he accepts the request. As an alternative, the backend system 116 could monitor the location of the driver computing device to determine whether the driver has begun driving toward the new location (thus inferring acceptance). In various embodiments, driver application logic 220 of a self-driven car may automatically respond with an acceptance of such requests. In one embodiment, the driver application logic 220 may present an offer of compensation to the driver (which may be communicated to the driver computing device 108 by, e.g., backend server 302) to relocate to the requested location in order to incentivize the driver (in some instances, the driver may be reluctant to move locations because he may have to pay his own vehicle expenses and/or may recognize the new location as a location that is less likely to yield passenger requests).

Driver application logic 220 may also present navigation information to the driver. For example, the navigation information may guide the driver to the location indicated by the backend system 116 at which the driver should wait for passenger requests. In various embodiments, driver application logic 220 may use the navigation information to control the driver to move to the new location if the driver is a self-driven vehicle or component thereof. In particular embodiments, the navigation information may include directions to drive a circuitous route that includes the new location while the driver is waiting for a transportation request from a passenger. For example, if the new location does not include a convenient place for the driver to park and wait, the navigation information may instruct the driver to circle a city block that includes the location the driver has been directed to.

Figure 3:
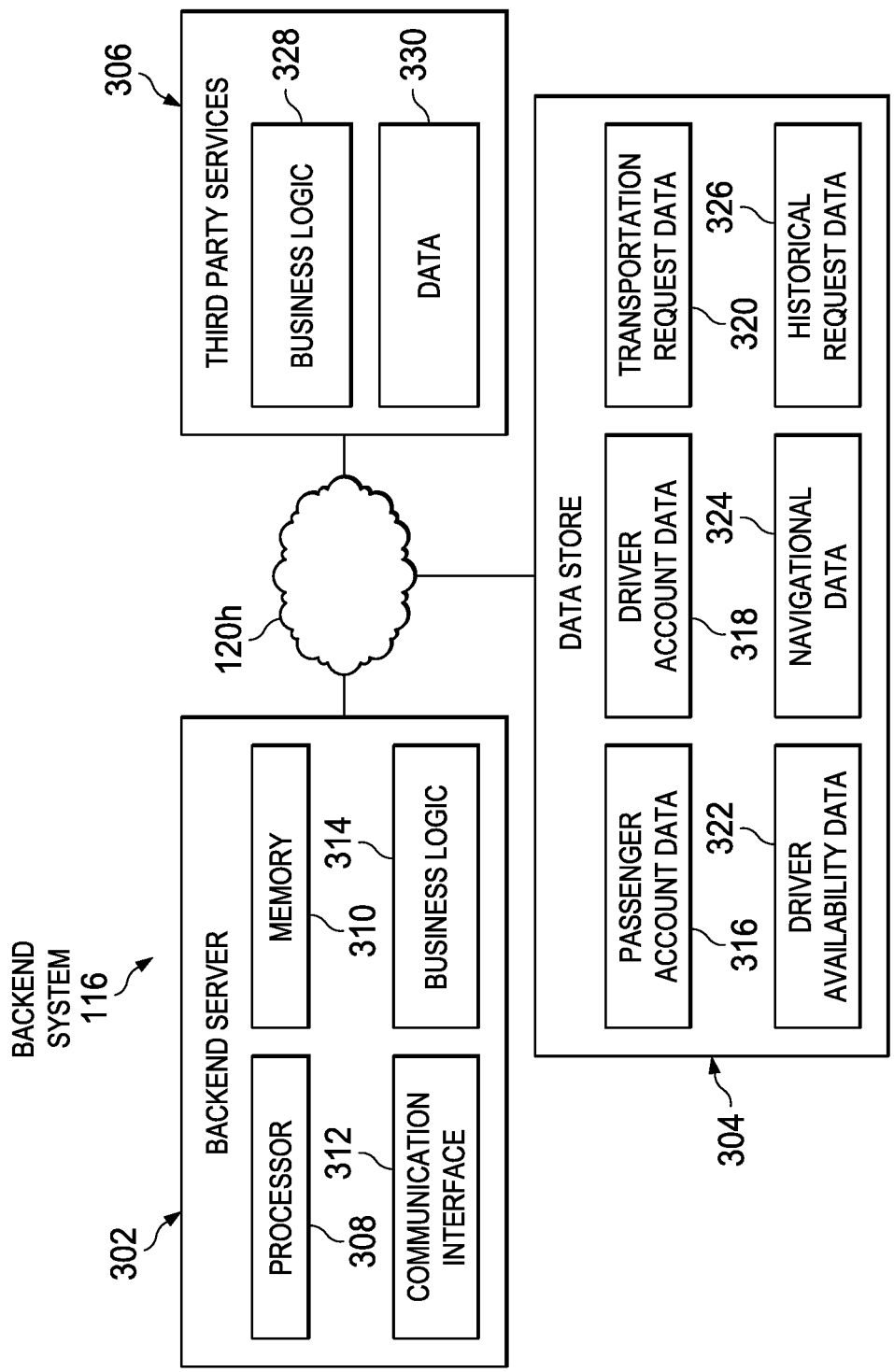
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120*h*. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers. In a particular embodiment, backend server 302 and data store 304 are controlled by the transportation service, while third party services 306 are controlled by a third party entity.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB). Data store 304 may be located on one or more computing devices that are distinct from backend server 302 or on the same device as at least a portion of backend server 302. Any of the information stored by data store 304 could additionally or alternatively be stored locally in memory 310 temporarily or persistently.

In the embodiment depicted, data store 304 includes passenger account data 316, driver account data 318, transportation request data 320, driver availability data 322, navigational data 324, and historical request data 326. The various data may be updated at any suitable intervals.

Passenger account data 316 may include any suitable information associated with accounts of subscribers to the transportation service, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the current amount of time the passenger has been waiting for a pickup, the total amount of time a passenger had to wait for a pickup, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, whether the driver is willing to relocate to optimized locations when not transporting passengers, or other suitable information.

Navigational data 324 may comprise information supporting navigation functions provided by the passenger applications and driver passenger applications. For example, navigational data 324 may comprise map data that may be sent to passenger computing devices 104 and driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip, or other suitable information associated with the trip.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or computing devices 104 and 108 and provide responses to the requests.

Backend server 302 may be in communication with each passenger computing device 104 and each driver computing device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information (e.g., the passenger's current location or other pickup location and directions to the current location or other pickup location) to the driver computing device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

In various embodiments, backend server 302 may optimize the placement of idle cars within a region to improve one or more wait time parameters in the region. A wait time parameter may be calculated based on expected wait times for prospective passengers and is explained in further detail below. Backend server may optimize (e.g., improve) the placement of idle drivers by taking into account one or more of estimated passenger demand, wait time parameter(s) (which itself might also be based on estimated passenger demand), the distance one or more of the idle drivers travel to optimized locations, or other suitable factors.

Figure 4:
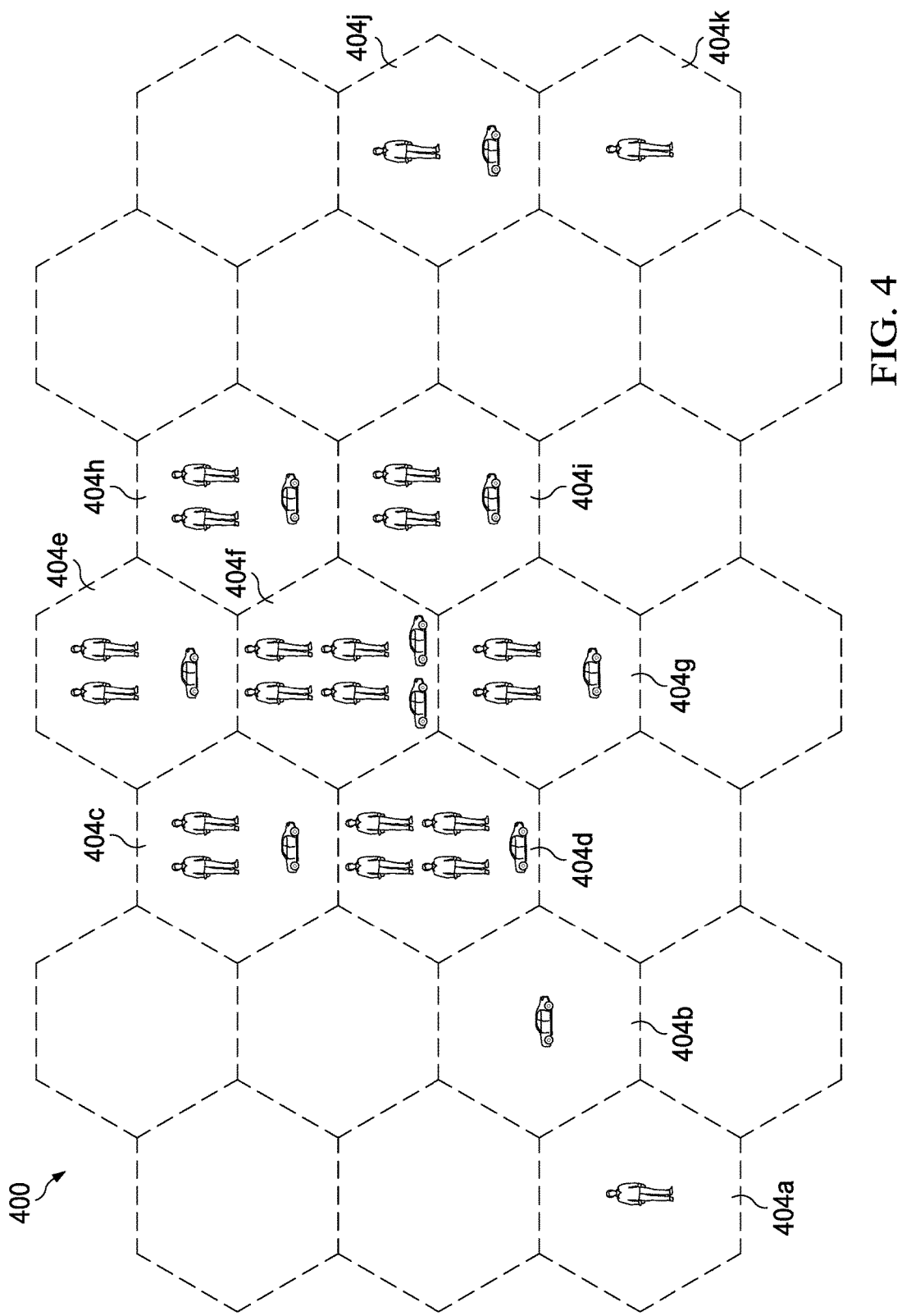
FIG. 4 illustrates a diagram of an example placement of drivers in accordance with certain embodiments.

FIG. 4 illustrates a diagram 400 of an example placement of drivers in accordance with certain embodiments. Diagram 400 depicts a geographical region broken up into several zones 404. Although the zones 404 are depicted as hexagonal shapes each having the same area, other embodiments may include regions with any suitable geographical delineations. For example, the zones 404 may be a different shape, such as square or rectangular. As another example, the zones 404 may include irregular shapes, including any concave or convex shapes. In particular embodiments, each zone 404 in a region is the same size and/or shape. In other embodiments, zones 404 may vary in size and/or shape from zone to zone. Zones may have any suitable areas such as a few square meters, a city block, a few square kilometers, several square kilometers, or other suitable area. Although zones 404 are contiguous with each other in the embodiment depicted, in various embodiments at least some of the zones 404 are not contiguous with other zones, such that the region may include areas that are not included within a zone.

Diagram 400 illustrates an example prospective placement of idle drivers. In diagram 400, a plurality of prospective passengers are displayed in various zones 404. A prospective passenger is a unit of measurement of the likelihood of a passenger request being received from a particular location over a particular timeframe or a unit of measurement of the expected number of passenger requests to be received from a location over a particular timeframe. The prospective passengers of diagram 400 may represent an expected number of passenger requests to be received over a particular timeframe which may be in the future. The prospective passengers represent estimated passenger demand for the particular zones 404. The timeframe may be any suitable timeframe, such as a specific point in time (e.g., 5:00 PM) or a range of time (e.g., 5:00-5:05).

In the embodiment illustrated, the placement of drivers is based on the expected demand for passengers as well as one or more wait time parameters. Accordingly, a larger number of drivers are placed near the centralized zones 404c-404i than in surrounding zones. Even within these centralized zones, the placement of cars is largely proportional to the expected passenger demand. For example, zone 404f with four prospective passengers includes two drivers, while zones 404c, 404e, 404h, 404i, and 404g with two prospective passengers each include one driver. Zone 404d, while only containing a single driver and four perspective passengers is bordered by zones that include drivers that could be used for transportation requests originating from zone 404d. The placement of drivers is also calculated to reduce passenger wait time. For example, although drivers are not placed in zones 404a or 404k, drivers are placed in neighboring zones 404b and 404j to reduce the wait time for prospective passengers from zones 404a and 404k. The embodiment depicted is only one of several different possible optimized placements of the drivers as the actual placement can vary based on several different factors, such as various wait time parameters, traffic conditions, and the current locations of drivers that are to be relocated to optimize the fleet placement (i.e., the arrangement of the idle drivers of the transportation service).

In various embodiments, backend server 302 may determine optimized placement of idle drivers. In particular embodiments, the placement of idle drivers is based on expected passenger demand across a region (e.g., in a plurality of locations of the region). In particular embodiments, the backend server 302 begins this process by determining expected passenger demand within a region. The expected demand may be determined in any suitable manger.

In one embodiment, expected passenger demand is determined for a plurality of locations of a region, such as each zone 404 of a plurality of zones 404. The expected passenger demand may be expressed in any suitable manner. For example, the expected passenger demand may represent an expected number of passenger requests to be received from a location over a particular timeframe, such as a five minute period. This may be referred to as an expected transportation request rate. In some embodiments, the timeframe may be selected to be a timeframe that is to occur after the determination of the fleet placement (in order to give the drivers time to travel to their new positions). As another example, the expected passenger demand may be a quantification that represents the chance that the next transportation request received from the region will originate from the zone.

The expected demand may be calculated for any suitable locations within the region, such as zones as described above, or other locations such as addresses, GPS coordinates (or groups of coordinates), or other suitable locations.

Any suitable data may be used to calculate the expected passenger demand for a particular area. For example, the expected passenger demand may be based on historical passenger demand as evidenced by historical request data 326. In a particular embodiment, expected passenger demand for a particular timeframe (e.g., 5:00-5:05 PM) on a particular day may be based on historical passenger demand over the same timeframe on one or more previous days with one or more similar characteristics (e.g., same day of the week, same weather, etc.). As another example, expected passenger demand may be based on pending transportation requests and/or transportation requests that were recently completed (thus evidencing recent demand). In a particular embodiment, the recent demand may be adjusted to determine the expected passenger demand by applying one or more patterns evidenced in the historical demand to current and/or recent demand. For example, if an analysis of historical demand (based on historical request data 326) indicates that transportation requests from a particular location decrease 25% from the 5:00-5:05 PM timeframe to the 5:30-5:35 PM timeframe on a particular day of the week, then for a particular day the recent passenger demand (i.e., the demand experienced from 5:00-5:05 PM) on that day may be adjusted downwards by 25% to determine the expected passenger demand for 5:30-5:35 PM on that day.

Expected passenger demand for a particular location may also be based on information regarding special circumstances associated with the location. For example, if it is known that an event is being held at a particular location, the expected passenger demand in neighboring locations may be increased during timeframes that passengers are expected to be traveling to the event and the expected passenger demand for the location of the event may be increased during timeframes in which passengers are expected to be leaving the event. As another example, expected passenger demand for a particular location may be adjusted based on weather experienced at the location if the historical passenger demand indicates that the weather affects the transportation request rate.

In various embodiments, the placement of idle drivers is based on one or more wait time parameters. A wait time parameter of a region is a value based on one or more expected wait times from one or more locations of the region given a particular layout of a fleet (i.e., the particular placement of available drivers throughout the region). Any suitable wait time parameter may be used. Examples of wait time parameters include an average expected wait time for all locations of a region (e.g., a weighted average of the wait times at the various locations of the region based on the expected passenger demand at each location), an average expected wait time for a portion of the locations of the region (e.g., some locations are excluded and then the average expected wait time is calculated, e.g., by taking a weighted average based on the expected passenger demand at each location and the associated wait times with each location), a maximum expected wait time among all locations (e.g., the wait time associated with the location of the region that would require the most travel time for a driver to reach it), a maximum expected wait time among a portion of the locations of a region (e.g., some locations are excluded and the highest wait time of the remaining locations is the maximum expected wait time), or other suitable wait time parameter.

A wait time parameter that excludes at least some of the locations from the measurement of the parameter may specify a percentage of the expected passengers to which the wait time parameter applies. For example, if 5% of the expected passengers are excluded based on poor wait times associated with their respective locations, then a wait time parameter measuring a maximum expected wait time would apply to 95% of the expected passengers. Any suitable portion of the locations may be excluded from various wait time parameters. For example, for average wait time calculations, locations having wait times at either extreme (short or long) may be excluded to give a more accurate representation of a typical wait time.

Any suitable data may be used to calculate a wait time for a particular location given a particular fleet layout. For example, the wait time may be based on historical traffic information as evidenced by navigational data 324 or data received from a third party service 306. For example, expected traffic conditions for a particular time on a particular day may be based on historical traffic conditions at the same time on one or more previous days with one or more similar characteristics (e.g., same day of the week, same weather, etc.). As another example, a wait time for a location may be based on current traffic conditions, as measured by data obtained from the speed of drivers of the transportation service or information obtained from a third party service 306. In a particular embodiment, current traffic conditions may be adjusted to determine expected future traffic conditions by applying one or more patterns evidenced in historical traffic conditions to the current traffic conditions. For example, if an analysis of historical traffic conditions indicate that the time to travel from a first zone to a second zone decreases 25% from 6:00 PM to 7:00 PM on a particular day of the week, then for a particular day the estimated time to travel from the first zone to the second zone as measured at 6:00 on that day may be adjusted downwards by 25% to determine the expected travel time on that day.

Wait times may also be based on information regarding special circumstances associated with the route from the drivers to the locations. For example, if it is known that an event is being held at a particular location or that inclement weather will affect road conditions, the expected travel times may be increased over normally projected travel times.

Backend server 302 is operable to arrange a fleet layout, determine whether the fleet layout is acceptable, and direct idle drivers to their assigned positions in the fleet layout. In various embodiments, the fleet layout determined by the backend server 302 may be based on any suitable parameters, such as a current fleet layout, projected passenger demand, one or more wait parameters, a distance one or more drivers will travel to reach their assigned location, other factors, or any suitable combinations thereof. Various aspects of this functionality is described in further detail in connection with FIGS. 5 and 6.

Figure 5:
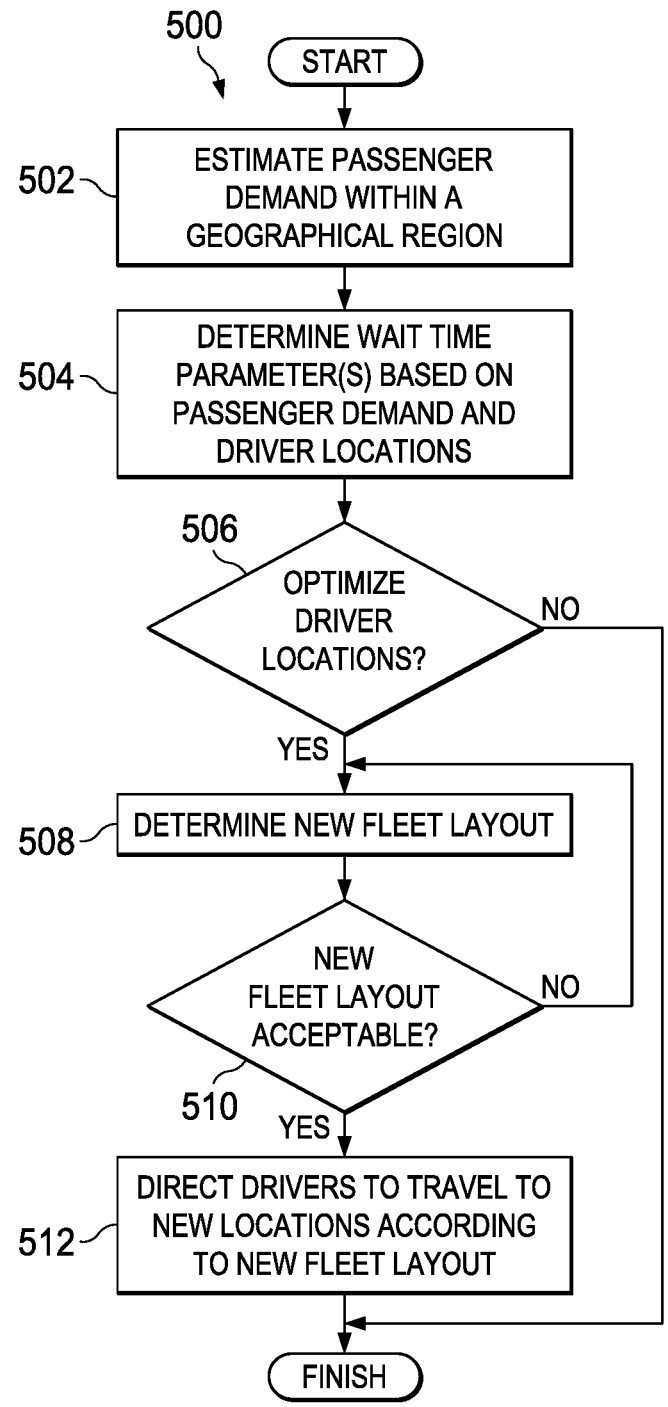
FIG. 5 illustrates a method for navigating drivers to selected locations to reduce passenger wait time in accordance with certain embodiments.

FIG. 5 illustrates a method 500 for navigating drivers to selected locations to reduce passenger wait time in accordance with certain embodiments. Various steps of FIG. 5 may be performed, for example, by a backend server 302.

At step 502, passenger demand within a geographical region is estimated. This may involve estimating, for each of a plurality of locations (e.g., zones or other locations) within the geographical region, a current passenger demand or future expected passenger demand at that location.

At 504, wait time parameters associated with the geographical region are determined. In various embodiments, such parameters may be based on current or future passenger demand and current or future driver locations. In one embodiment, the wait time parameter(s) are based on a time period in the near future (e.g., 5 minutes, 10 minutes, 30 minutes, etc. from the current time). The expected fleet layout at that time period may be determined based on current locations of idle drivers, projections of which of these idle drivers will be unavailable during at least a portion of the time period, projections of which currently unavailable drivers will be idle during at least a portion of the time period (and where these drivers will be located), or other suitable information.

Wait time parameters may be determined in any suitable manner and are based on wait times determined for various locations in the geographical region. In various embodiments, wait times may be calculated for all zones or other locations of the region. In some embodiments, wait times are not calculated for particular zones or other locations of the region. For example, a configurable parameter may allow backend server 302 to exclude certain locations from the wait time calculations. As an example, if the parameter specifies that 5% of the locations that are least likely to produce passengers during the time frame should be excluded, then the locations with the lowest expected transportation request rates (that cumulatively produce only 5% of the transportation requests) are excluded from the wait time measurements, and the wait time parameters are based on the wait times measured for the remaining locations.

In one example, a wait time for a particular location is measured by analyzing the time it would take one or more drivers of the expected fleet layout to drive to the particular location, given the traffic conditions that are expected to exist at the appropriate time period. The wait time may be the shortest estimated time for a driver to reach the particular location or it may be a combination of one or more estimated times (e.g., using a weighted average based on the likelihood that the drivers associated with the estimated times would be assigned to pick up a passenger at the particular location).

At step 506 it is determined whether the driver locations should be optimized. This determination may be based on any suitable parameters, such as the current or expected fleet layout, current or projected passenger demand, one or more wait parameters, a distance one or more drivers will travel to reach their assigned location, other factors, or any suitable combinations thereof.

As an example, if the current or expected fleet layout is associated with one or more wait time parameters that does not meet a predetermined threshold, backend server 302 may determine that the fleet should be rearranged to optimize driver locations. In various embodiments, one or more wait parameter values may be analyzed in combination with the distance one or more drivers would need to move in order to determine whether the fleet layout should be rearranged and/or whether a particular driver should be assigned a new location. For example, the change in a wait parameter value that would result from a fleet layout reconfiguration may be compared against a total number of miles driven by drivers as a result of the reconfiguration to determine whether the reconfiguration is acceptable. In particular embodiments, if a particular wait parameter value is unacceptable, the fleet may be reconfigured regardless of the number of miles driven by the drivers that are relocated. In various embodiments, if a plurality of drivers are to be relocated, the assignment of the drivers to the new locations is optimized to result in the lowest possible amount of miles driven collectively by the drivers.

If the driver locations are to be optimized, a new fleet layout is determined at step 508. If the new fleet layout is not acceptable (e.g., based on any of the same determinations made at step 506 to determine whether the driver locations should be optimized), a different fleet layout is again determined at step 508. Once an acceptable fleet layout has been generated, one or more idle drivers are directed to their new locations based on the new fleet layout at step 512. In a particular embodiment, one or more drivers that were unavailable at the time the new fleet layout was generated may be earmarked to be moved to a new location according to the fleet layout. Upon becoming available (when their passenger is dropped off), the one or more drivers are directed to their respective locations specified in the fleet layout.

Some of the steps illustrated in FIG. 5 may be repeated, combined, modified or deleted where appropriate, and additional steps may also be included. Additionally, steps may be performed in any suitable order or concurrently without departing from the scope of particular embodiments.

Figure 6:
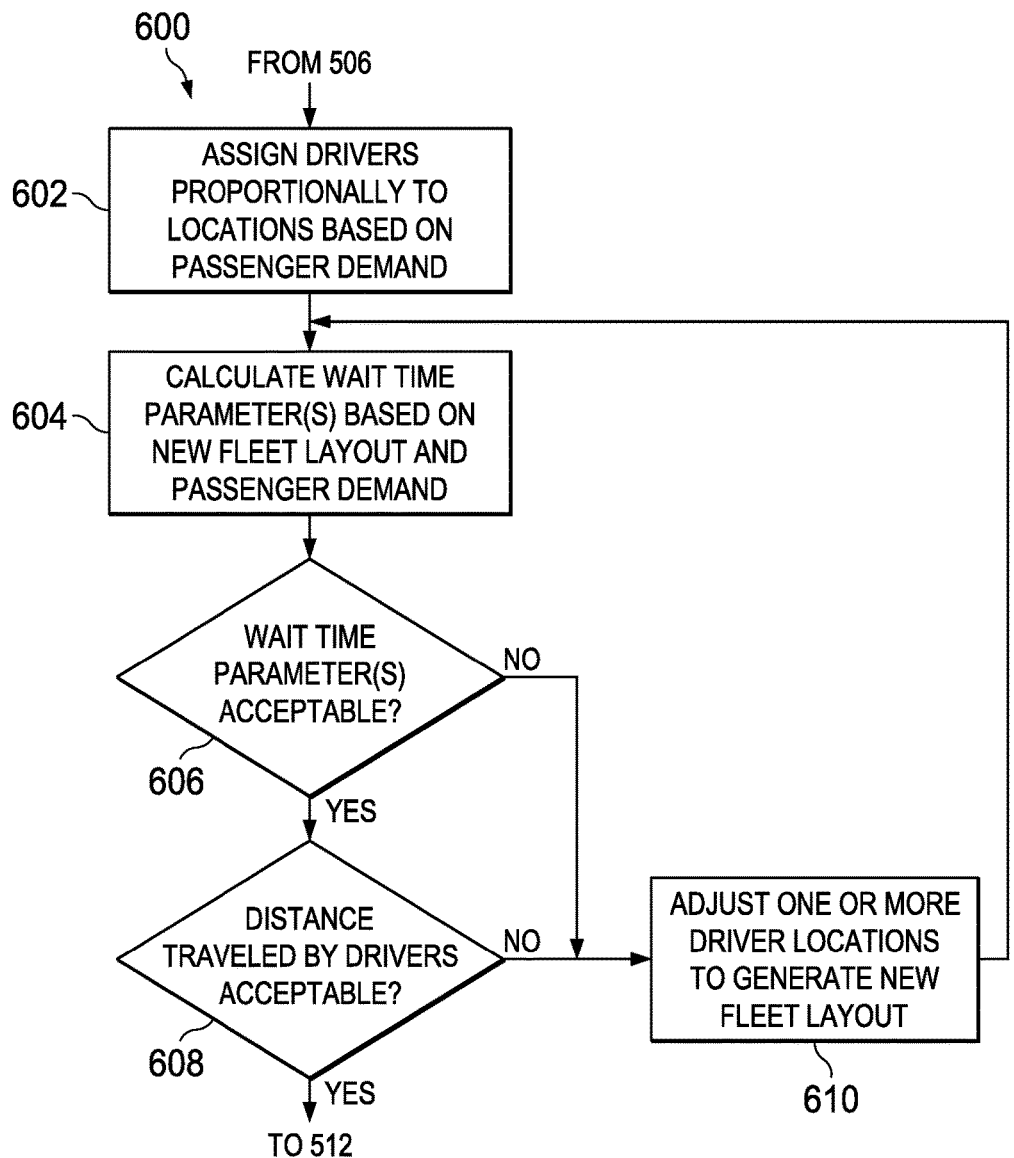
FIG. 6 illustrates a method for selecting locations for drivers in accordance with certain embodiments.

FIG. 6 illustrates a method 600 for selecting locations for drivers in accordance with certain embodiments. Various steps of FIG. 6 may be performed, for example, by a backend server 302.

Steps 602 through 610 of method 600 may be viewed as one possible implementation of steps 508 and 510 of method 500. At step 602, drivers are assigned proportionally to locations based on passenger demand. For example, if a particular zone is expected to generate 10% of transportation requests for a particular time period, then the fleet layout may specify that 10% of the drivers expected to be idle at that time should be located in the zone. In various embodiments, the drivers may be spaced around the zone so as to improve expected wait times around the zone (and in neighboring zones). As another example, if a particular zone is expected to generate 0.1% of transportation requests for a particular time period and only 100 drivers are expected to be available, then the backend server does not allocate a driver to that zone.

At step 604, one or more wait time parameter(s) based on the determined fleet layout are calculated in accordance with the passenger demand associated with the time period the backend server is analyzing. At step 606, it is determined whether the time parameter(s) are acceptable. This may involve determining that each time parameter has satisfied a threshold value, that the combination of time parameters is acceptable (e.g., a high maximum wait time value may be allowed if an average wait time value is achieved or vice versa), or any other suitable determination. In some embodiments, one or more of the wait times used to calculate the wait time parameter(s) may be analyzed and if is determined that one or more of the wait time parameters may be optimized by improving such wait times without impacting other wait times disproportionately, it may be determined that the wait time parameter(s) are unacceptable.

When it is determined that one or more wait time parameters are unacceptable, one or more driver locations within the projected fleet layout are adjusted (e.g., by improving on worst case wait times), and the wait time parameters are recalculated at 604 and checked for acceptability again at 606. Once the wait time parameters are found to be acceptable, an analysis of whether the distance traveled by the drivers to achieve the new fleet layout is acceptable is performed at step 608. If the improvement in the wait time parameters does not justify the distance traveled, the driver locations may again be adjusted at step 610 and the various steps repeated until an acceptable fleet layout is achieved. Subsequently, the drivers are navigated to their new locations.

Some of the steps illustrated in FIG. 6 may be repeated, combined, modified or deleted where appropriate, and additional steps may also be included. Additionally, steps may be performed in any suitable order or concurrently without departing from the scope of particular embodiments. For example, in particular embodiments, steps 606 and 608 are performed simultaneously. That is, a determination of whether a new fleet layout is acceptable may be based on a combination of one or more wait time parameters that are achieved and a distance to be driven by one or more drivers in accordance with the new fleet layout.

It is also important to note that the steps in FIGS. 5-6 illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend server 116 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   estimating, by a processing device for a first plurality of locations within a geographical region, passenger demand for transportation by a driver associated with a transportation service;
   determining, by the processing device, a wait time parameter for the geographical region, wherein the wait time parameter is based on one or more expected wait times associated with one or more locations of the geographical region, wherein each of the one or more expected wait times is an estimate of time that would elapse from a submission of a transportation request from an associated location until a respective driver of the transportation service is to arrive at the associated location;
   determining, by the processing device, to send a first subset of a plurality of drivers to a common area;
   selecting, by the processing device, different locations within the common area for each driver of the first subset to stagger the first subset of the plurality of drivers in the common area; and
   transmitting, by the processing device to a plurality of driver computing devices associated with the plurality of drivers, navigational data to direct the plurality of drivers to a second plurality of locations within the geographical region based on the estimated passenger demand and the wait time parameter, wherein the second plurality of locations comprise the different locations within the common area.

2. The method of claim 1, wherein the wait time parameter indicates an expected maximum wait time associated with the one or more locations of the geographical region.

3. The method of claim 1, wherein the wait time parameter indicates an expected average wait time associated with a plurality of locations of the geographical region.

4. The method of claim 1, wherein the wait time parameter specifies a percentage of expected passengers to which the wait time parameter applies.

5. The method of claim 1, further comprising selecting a first location of the second plurality of locations for a first driver of the plurality of drivers based on a current location of a first driver computing device associated with the first driver.

6. The method of claim 1, wherein the estimating of the passenger demand is based, at least in part, on historical transportation requests.

7. The method of claim 1, wherein the wait time parameter is determined based, at least in part, on current traffic conditions in the geographical region.

8. The method of claim 1, further comprising directing a first driver of the plurality of drivers to drive a circuitous route including a first location of the second plurality of locations.

9. The method of claim 1, wherein one or more of the plurality of driver computing devices is associated with a respective self-driven vehicle, wherein the processing device is to control movement of the respective self-driven vehicle by the transmitting of the navigational data.

10. The method of claim 1, wherein a first driver of the plurality of drivers is not transporting a passenger when the wait time parameter is determined.

11. The method of claim 1, wherein a first driver of the plurality of drivers is transporting a passenger when the wait time parameter is determined but drops off the passenger before being directed to a first location of the second plurality of locations.

12. An apparatus comprising:
    a memory; and
    at processing device communicably coupled to the memory, the processing device to execute instructions to:
        estimate, for a first plurality of locations within a geographical region, passenger demand for transportation by a driver associated with a transportation service;
        determine a wait time parameter for the geographical region, wherein the wait time parameter is based on one or more expected wait times associated with one or more locations of the geographical region, wherein each of the one or more expected wait times is an estimate of time that would elapse from a submission of a transportation request from an associated location until a respective driver of the transportation service is to arrive at the associated location;
        determine to send a first subset of a plurality of drivers to a common area;
        select different locations within the common area for each driver of the first subset to stagger the first subset of the plurality of drivers in the common area; and
        transmit, to a plurality of driver computing devices associated with the plurality of drivers, navigational data to direct the plurality of drivers to a second plurality of locations within the geographical region based on the estimated passenger demand and the wait time parameter, wherein the second plurality of locations comprise the different locations within the common area.

13. The apparatus of claim 12, wherein the wait time parameter indicates an expected maximum wait time associated with the one or more locations of the geographical region.

14. The apparatus of claim 12, wherein the wait time parameter indicates an expected average wait time associated with a plurality of locations of the geographical region.

15. The apparatus of claim 12, wherein the wait time parameter specifies a percentage of expected passengers to which the wait time parameter applies.

16. A computer-readable non-transitory medium storing one or more instructions which, when executed by a processing device, cause the processing device to:
    estimate, for a first plurality of locations within a geographical region, passenger demand for transportation by a driver associated with a transportation service;
    determine a wait time parameter for the geographical region, wherein the wait time parameter is based on one or more expected wait times of one or more prospective passengers, wherein each of the one or more expected wait times is an estimate of time that would elapse from a submission of a transportation request by a prospective passenger until a respective driver of the transportation service is to pick up the prospective passenger;
    determine to send a first subset of a plurality of drivers to a common area;
    selecting different locations within the common area for each driver of the first subset to stagger the first subset of the plurality of drivers in the common area; and
    transmit, to a plurality of driver computing devices associated with the plurality of drivers, navigational data to direct the plurality of drivers to a second plurality of locations within the geographical region based on the estimated passenger demand and the wait time parameter, wherein the second plurality of locations comprise the different locations within the common area.

17. The computer-readable non-transitory medium of claim 16, wherein the wait time parameter indicates an expected maximum wait time associated with the one or more prospective passengers of the geographical region.

18. The computer-readable non-transitory medium of claim 16, wherein the wait time parameter indicates an expected average wait time associated with a plurality of prospective passengers of the geographical region.

19. The computer-readable non-transitory medium of claim 16, wherein the wait time parameter specifies a percentage of expected passengers to which the wait time parameter applies.

20. The apparatus of claim 12, wherein one or more of the plurality of driver computing devices is associated with a respective self-driven vehicle, wherein the processing device is to control movement of the respective self-driven vehicle by transmitting the navigational data.

* * * * *